(12) United States Patent
Tambasco et al.

(10) Patent No.: US 10,689,803 B2
(45) Date of Patent: *Jun. 23, 2020

(54) AQUEOUS POLYMER DISPERSION COMPOSITION AND METHOD OF ADHERING TEXTILE MATERIALS

(71) Applicant: Textile Rubber and Chemical Company, Inc., Dalton, GA (US)

(72) Inventors: Giuseppe V Tambasco, Marietta, GA (US); Larry E Mashburn, Dalton, GA (US)

(73) Assignee: TexTile Rubber and Chemical Company, Inc., Dalton, GA (US)

( * ) Notice: Subject to any disclaimer, the term of this patent is extended or adjusted under 35 U.S.C. 154(b) by 327 days.

This patent is subject to a terminal disclaimer.

(21) Appl. No.: 15/469,637

(22) Filed: Mar. 27, 2017

(65) Prior Publication Data

US 2018/0274168 A1 Sep. 27, 2018

(51) Int. Cl.
*D06N 7/00* (2006.01)
*C08J 3/05* (2006.01)

(52) U.S. Cl.
CPC .............. *D06N 7/0073* (2013.01); *C08J 3/05* (2013.01); *D06N 7/0076* (2013.01);
(Continued)

(58) Field of Classification Search
CPC .. D06N 7/0073; D06N 7/0076; D06N 7/0084; D06N 2203/04; D06N 2203/041;
(Continued)

(56) References Cited

U.S. PATENT DOCUMENTS 4,205,112 A 5/1980 Mervin
4,808,459 A 2/1989 Smith et al.
(Continued)

FOREIGN PATENT DOCUMENTS

JP 6322664 11/1994
JP 2008099805 10/2006
(Continued)

OTHER PUBLICATIONS

European Search Report, Application No. 17189588.1 dated Nov. 17, 2017.
(Continued)

*Primary Examiner* — Robert S Walters, Jr.
(74) *Attorney, Agent, or Firm* — Robert E. Richards; Richards IP Law (57) ABSTRACT

The invention comprises a method. The method comprises applying a composition to a tufted primary backing material, wherein the primary backing material has a first primary surface and a second primary surface, wherein tufts extend outwardly from the first primary surface and loop backs are formed on the second primary surface, and wherein the composition is applied to the loop backs and second primary surface of the tufted primary backing material. The composition comprises an aqueous polymer dispersion of colloidal thermosetting polymer particles or colloidal thermoplastic polymer particles and second thermoplastic polymer particles dispersed in the water, wherein the second thermoplastic polymer particles have an average particle size of approximately 200 micron to approximately 1,000 microns. The method further comprises heating the tufted primary backing material and aqueous polymer dispersion to remove water therefrom. A novel adhesive composition is also disclosed.

13 Claims, 3 Drawing Sheets

(52) U.S. Cl.
CPC ....... *D06N 7/0084* (2013.01); *D06N 2203/04* (2013.01); *D06N 2203/041* (2013.01); *D06N 2203/042* (2013.01); *D06N 2203/045* (2013.01); *D06N 2203/047* (2013.01); *D06N 2203/068* (2013.01); *D06N 2205/023* (2013.01); *D06N 2211/066* (2013.01)

(58) Field of Classification Search
CPC ....... D06N 2203/042; D06N 2203/045; D06N 2203/047; D06N 2203/068; D06N 2205/023; D06N 2211/066; C08J 3/05
See application file for complete search history.

(56) References Cited

U.S. PATENT DOCUMENTS

| | | |
|---|---|---|
| 4,836,871 A | 6/1989 | Kato |
| 5,856,376 A | 1/1999 | Wong |
| 5,902,663 A | 5/1999 | Justesen et al. |
| 5,962,564 A | 10/1999 | Braud et al. |
| 6,383,586 B1 | 5/2002 | Langland |
| 6,475,619 B2 | 11/2002 | Goldberg |
| 6,521,696 B2 | 2/2003 | Oates et al. |
| 6,673,432 B2 | 1/2004 | Kiik et al. |
| 6,743,741 B1 | 6/2004 | Araki et al. |
| 6,808,786 B2 | 10/2004 | Theiss |
| 7,018,492 B1 | 3/2006 | Mumm et al. |
| 7,081,498 B2 | 8/2006 | Moeller et al. |
| 7,267,870 B2 | 9/2007 | Matsumoto et al. |
| 7,335,423 B2 | 2/2008 | Huber |
| 7,348,048 B2 | 3/2008 | Rabasco et al. |
| 7,357,971 B2 | 4/2008 | Bieser et al. |
| 7,645,829 B2 | 1/2010 | Tse et al. |
| 7,816,003 B1 | 10/2010 | Luchio |
| 7,910,194 B2 | 3/2011 | Bieser et al. |
| 8,283,017 B2 | 10/2012 | Bieser et al. |
| 8,496,769 B2 | 7/2013 | Brumbelow et al. |
| 9,051,683 B2 | 6/2015 | Brumbelow et al. |
| 9,376,769 B2 | 6/2016 | Bieser et al. |
| 2001/0046581 A1 | 11/2001 | Brumbelow et al. |
| 2002/0134486 A1 | 9/2002 | Brumbelow et al. |
| 2004/0043184 A1 | 3/2004 | Kobayashi et al. |
| 2004/0258874 A1 | 12/2004 | Desai |
| 2005/0281977 A1 | 12/2005 | Mashburn |
| 2007/0071988 A1 | 3/2007 | Botros |
| 2007/0082172 A1 | 4/2007 | Derbyshire et al. |
| 2007/0254130 A1 | 11/2007 | Cheek |
| 2007/0259163 A1 | 11/2007 | Connolly et al. |
| 2007/0270064 A1 | 11/2007 | Aseere |
| 2008/0274307 A1 | 11/2008 | Chereau et al. |
| 2009/0022936 A1 | 1/2009 | McGill |
| 2010/0137493 A1 | 6/2010 | Tilton |
| 2010/0247814 A1 | 9/2010 | Nisikawa et al. |
| 2010/0310813 A1 | 12/2010 | McGill |
| 2013/0206630 A1 | 8/2013 | Burmeister |
| 2013/0261238 A1 | 10/2013 | Arango |
| 2013/0344281 A1 | 12/2013 | Wright et al. |
| 2014/0349060 A1 | 11/2014 | Mueller et al. |
| 2015/0086746 A1 | 3/2015 | B.R. de Castro et al. |
| 2016/0201239 A1 | 8/2016 | Baer et al. |
| 2016/0298003 A1 | 10/2016 | Alsoryai |

FOREIGN PATENT DOCUMENTS

| | | |
|---|---|---|
| WO | 9506771 A1 | 3/1995 |
| WO | 9940250 A2 | 8/1999 |
| WO | 0132976 A1 | 5/2001 |
| WO | 0140561 A2 | 6/2001 |
| WO | 2004035910 A1 | 4/2004 |
| WO | 2006032433 A1 | 3/2006 |

OTHER PUBLICATIONS

European Search Report, Application No. 17189839.8 dated Mar. 7, 2018.
Machine translation of JP 5148751.
Machine translation of JP 6322664.
Machine translation of JP 6059176.
U.S. Appl. No. 15/340,616, filed Nov. 1, 2016.
U.S. Appl. No. 15/608,334, filed May 30, 2017.
English Abstract of JP 20899805.
U.S. Appl. No. 15/989,891, filed May 25, 2018.
U.S. Appl. No. 16/229,588, filed Dec. 21, 2018.
U.S. Appl. No. 16/679,653, filed Nov. 11, 2019.

AQUEOUS POLYMER DISPERSION COMPOSITION AND METHOD OF ADHERING TEXTILE MATERIALS

FIELD OF THE INVENTION

The present invention generally relates to a novel adhesive composition. More particularly, the present invention relates to a method for securing tufted yarns in a primary backing. The present invention also related to the lamination of fabrics. Specifically, the present invention relates to a method of attaching a secondary backing material to a tufted primary backing material of a carpet using an aqueous polymer dispersion that also contains thermoplastic polymer particles of a specific size.

BACKGROUND OF THE INVENTION

Carpets are typically constructed from a primary backing material and a face pile formed on one side. Face pile can be form in the primary backing by tufting a face pile in the primary backing. Currently, the majority of carpet manufactured in the U.S. is made by a tufting process. The tufting process forms looped or cut pile on one side of a primary backing and loop backs on the opposite side by a process well known in the art. The primary backing can be made from a woven or nonwoven fabric of natural or synthetic materials.

After the primary backing is tufted, an adhesive precoat may be applied to lock or bind the tufts in the primary backing. Typically, the adhesive precoat is an aqueous polymer dispersion, such as a styrene butadiene aqueous polymer dispersion. The aqueous polymer dispersion-coated primary backing is then heated to remove the water from the aqueous polymer dispersion and the polymer locks or binds the tuft loops in the primary backing. Then, a secondary backing may optionally be adhesively attached by applying a coating of adhesive on the side of the primary backing opposite the face pile. Such adhesive is typically a latex, a polyurethane or a hot melt adhesive. Then, a secondary backing is brought into intimate contact with the uncured polyurethane or the molten hot melt adhesive. The adhesive is then allowed to cool or cure, thereby adhesively attaching the secondary backing to the tufted primary backing.

It would be desirable to both achieve tuft lock and to attach a secondary backing to a tufted primary backing of a carpet using a single adhesive system. It would also be desirable to both achieve tuft lock and attach a secondary backing to a tufted primary backing of a carpet using reduced amounts of adhesive without sacrificing desired physical properties of the finished product. Additionally, it would also be desirable to both achieve tuft lock and attach a secondary backing to a tufted primary backing of a carpet in a more energy efficient manner.

SUMMARY OF THE INVENTION

The present invention satisfies the foregoing needs by providing an improved adhesive system for tufted carpet.

In one disclosed embodiment, the present invention comprises a product. The product comprises an aqueous dispersion of colloidal thermosetting polymer particles or colloidal thermoplastic polymer particles and thermoplastic polymer particles dispersed in the water, wherein the thermoplastic polymer particles have an average particle size of approximately 200 micron to approximately 1,000 microns.

In another disclosed embodiment, the present invention comprises a method. The method comprises applying a composition to a tufted primary backing material, wherein the primary backing material has a first primary surface and a second primary surface, wherein tufts extend outwardly from the first primary surface and loop backs are formed on the second primary surface, and wherein the composition is applied to the loop backs and second primary surface of the tufted primary backing material. The composition comprises an aqueous dispersion of colloidal thermosetting polymer particles or colloidal thermoplastic polymer particles and thermoplastic polymer particles dispersed in the water, wherein the thermoplastic polymer particles have an average particle size of approximately 200 micron to approximately 1,000 microns. The method further comprises heating the tufted primary backing material and composition to remove water therefrom.

In another disclosed embodiment, the present invention comprises a method. The method comprises applying a composition to a tufted primary backing material, wherein the primary backing material has a first primary surface and a second primary surface, wherein tufts extend outwardly from the first primary surface and loop backs are formed on the second primary surface, and wherein the composition is applied to the loop backs and second primary surface of the tufted primary backing material. The composition comprises an aqueous dispersion of colloidal thermosetting polymer particles or colloidal thermoplastic polymer particles and thermoplastic polymer particles dispersed in the water, wherein the thermoplastic polymer particles have an average particle size of approximately 200 micron to approximately 1,000 microns. The method further comprises heating the tufted primary backing material and composition to remove water therefrom and allowing the primary backing material to cool.

In another disclosed embodiment, the present invention comprises a method. The method comprises applying a composition to a tufted primary backing material, wherein the primary backing material has a first primary surface and a second primary surface, wherein tufts extend outwardly from the first primary surface and loop backs are formed on the second primary surface, and wherein the composition is applied to the loop backs and second primary surface of the tufted primary backing material. The composition comprises an aqueous dispersion of colloidal thermosetting polymer particles or colloidal thermoplastic polymer particles and thermoplastic polymer particles dispersed in the water, wherein the thermoplastic polymer particles have an average particle size of approximately 200 micron to approximately 1,000 microns. The method further comprises heating the tufted primary backing material and composition to remove water therefrom, applying pressure to the thermoplastic polymer particles on the second primary surface of the tufted primary backing material so that the thermoplastic polymer particles are formed into a film and allowing the primary backing material to cool.

Accordingly, it is an object of the present invention to provide an improved carpet or synthetic turf adhesive system.

Another object of the present invention is to provide a carpet and synthetic turf adhesive system that requires the use of relatively smaller amounts of adhesive.

A further object of the present invention is to provide a carpet and synthetic turf adhesive system that does not sacrifice desired physical properties of the finished product.

Yet another object of the present invention is to provide an improved adhesive system for attaching a secondary backing to a primary backing of a carpet or synthetic turf.

A further object of the present invention is to provide an improved adhesive system for securing tuft loop backs to a primary backing of a tufted carpet or a tufted synthetic turf.

Another object of the present invention is to provide an improved adhesive system that is more energy efficient than prior art systems.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
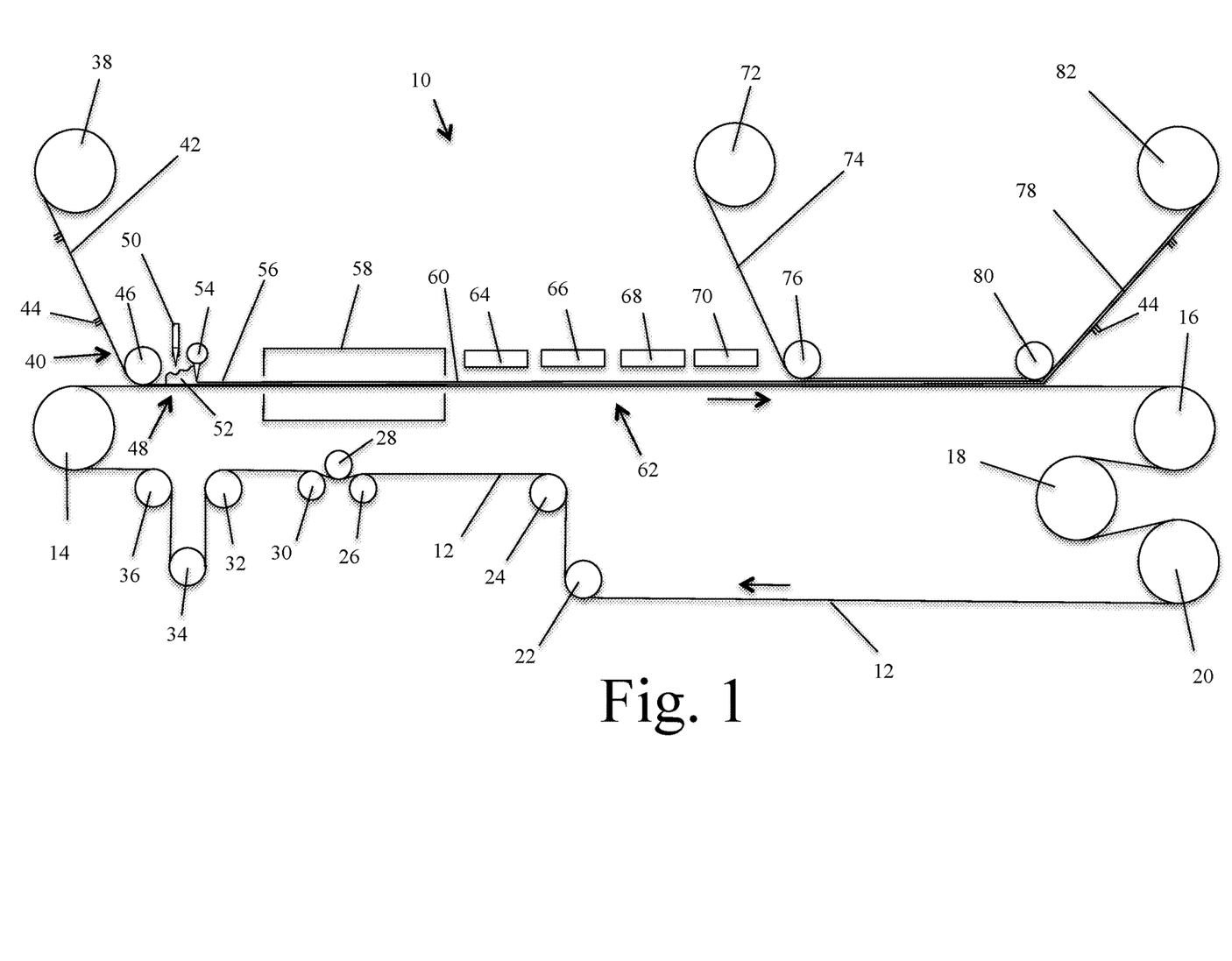
FIG. 1 is a schematic view of a disclosed embodiment of an apparatus for preparing carpet or synthetic turf using the adhesive system of the present invention.

Referring now to the drawing in which like numbers indicate like elements throughout the several views, there is shown in FIG. 1 a disclosed embodiment of an apparatus 10 for attaching a secondary backing material to a primary backing material of a carpet or synthetic turf in accordance with the present invention. The apparatus 10 comprises an endless conveyor belt 12 extending along and endless conveyor path over four drive rollers 14, 16, 18 and 20, which are driven by an electric motor (not shown), idler rollers 22, 24, belt guide rollers 26, 28, 30 and belt tensioner rollers 32, 34 and 36. The speed of the belt 12 is variably controllable to adjust to varying manufacturing needs.

From the drive roller 14, the conveyor belt 12, which preferably is constructed from Teflon coated fiberglass, is seen to pass around the drive rollers 16, 18, 20. The belt 12 is delivered to the idler rollers 22, 24, to the belt guide rollers 26, 28, 30, to the belt tensioner rollers 32, 34, 36 and then back to the drive roller 14.

Figure 2:
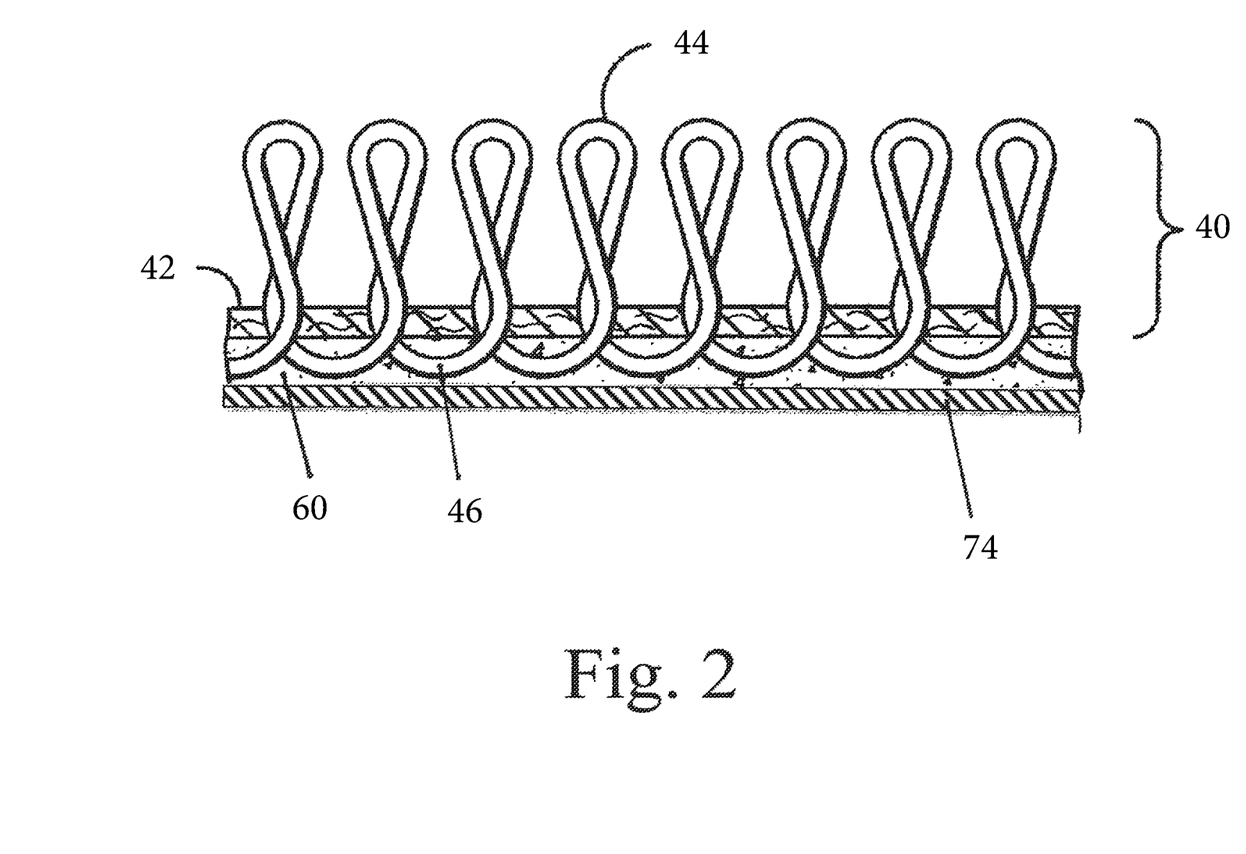
FIG. 2 is a cross-sectional side view of a tufted carpet.

Positioned above the belt 12 adjacent the drive roller 14 is a supply roll 38 of tufted greige goods 40 (FIG. 2). The tufted greige goods 40 comprise a primary backing material 42 and tufted yarns that form a face pile 44 on one side of the primary backing material and loop backs 46 on the other side of the primary backing material. The face pile 44 is shown in the disclosed embodiment as looped pile. However, face pile useful in the present invention can also be cut pile, or in the case of synthetic turf, individual filaments. In addition, the primary backing material 42 is shown as being tufted. The primary backing material 42 can be woven or nonwoven. Both the face pile 44 and the primary backing material 42 can be made from natural or synthetic materials. Furthermore, the face pile 44 and primary backing material 42 can be made from the same material or different materials. Suitable thermoplastic materials for the face pile 44 and primary backing material 42 include, but are not limited to, nylon, including polyadipamide, polycaprolactam, copolymers and blends thereof; polyolefins, including polyethylene, polypropylene, copolymers and blends thereof; thermoplastic polyesters, including polytrimethyleneterephthlate and polyethyleneterephthalate, and blends thereof; and acrylics, including polyacrylonitrile; co-polymers and blends thereof.

The tufted greige goods 40 is fed from the supply roll 38, around a roller 46 and onto the belt 12 where it lays flat on the surface of the belt and moves in unison with the belt. As can be seen in FIG. 1, the tufted greige goods 40 is positioned so that the face pile 44 extends downwardly from the primary backing material 42 so that the face pile is adjacent to and contacts the belt 12 and the primary backing material faces upwardly. The tufted greige goods 40 on the belt 12 moves from the roller 46 to a polymer deposition station 48. The polymer deposition station 48 includes a traversing downwardly extending spout 50 disposed above the tufted greige goods 40 on the belt 12. An aqueous polymer dispersion or polymer emulsion also having thermoplastic polymer particles dispersed therein in accordance with the present invention is delivered into a mixer/frothing machine (not shown) where the aqueous polymer dispersion is made into a frothed foam. While the present invention has been disclosed as preparing a foam using a frothing machine, it is specifically contemplated that a foam of the aqueous polymer dispersion can be prepared by any method known in the art, including incorporating a blowing agent in the aqueous polymer dispersion. The aqueous polymer dispersion foam is transferred from the mixer/frothing machine through a flexible hose (not shown) to the spout 50. The spout 50 traverses back and forth across the width of the tufted greige goods 40 on the belt 12 and the aqueous polymer dispersion foam is dispensed from the spout onto the primary backing material 42. The aqueous polymer dispersion foam forms a puddle 52 on the upper surface of the primary backing material 42. As the aqueous polymer dispersion foam-bearing tufted greige goods 40 moves with the belt 12, it passes under a doctor bar 54 which transforms the puddle of aqueous polymer dispersion foam 52 into a layer 56 of uniform thickness across the width of the primary backing material 42 of the tufted greige goods 40. The doctor bar 54 is set to a height so that the foam puddle 52 is transformed into a layer 56 of a thickness so that sufficient polymer particles are applied to the primary backing material 42 so that sufficient tuft lock is achieved for the loop backs 46 in the primary backing material and sufficient bond strength is provided so that a secondary backing material can be attached to a primary backing material. Preferably, the doctor bar 54 is set to a height so that the foam is formed into a layer of a thickness so that approximately 2 ounces per square yard to approximately 16 ounces per square yard of polymer particles are uniformly applied to the primary backing material 42; more preferably, approximately 4 ounces per square yard to approximately 12 ounces per square yard; more preferably approximately 6 ounces per square yard to approximately 10 ounces per square yard; especially, approximately 8 ounces per square yard.

While the present embodiment has been disclosed as applying an aqueous polymer dispersion foam to the primary backing material 42, it is specifically contemplated that the aqueous polymer dispersion can also be applied to the primary backing material 42 as a liquid; i.e., in a non-foamed state.

The aqueous polymer dispersion comprises water and solid colloidal polymer particles. The aqueous dispersion is colloidally stable, meaning that it can sit on a shelf for years and the colloidal polymer particles will remain dispersed, without sedimentation of particles making "sludge" at the bottom. The colloidal polymeric particles usually have a diameter of a few hundred nanometers or less. Depending on the particular application, there can also be a complex mixture of pigments, surfactants, plasticizing aids and/or rheological modifiers. The aqueous polymer dispersion can be any aqueous polymer dispersion that can be used for tuft lock or tuft bind in tufted carpets or tufted synthetic turf. Such aqueous polymer dispersions are well known and are commercially available. The colloidal polymer particles are preferably either thermosetting polymers or first thermoplastic polymers. Additionally, in the water portion of the aqueous polymer dispersion are uniformly dispersed larger second thermoplastic polymer particles. The second thermoplastic polymer particles have a particles size that is sufficiently small such that they can be uniformly dispersed in the water portion of the aqueous polymer dispersion, but sufficiently large such that the thermoplastic polymer particles do not substantially penetrate the interstices of the primary backing material, but, instead form a layer on the surface of the primary backing material to which the aqueous polymer dispersion is applied. Preferably, the second thermoplastic polymer particles have an average particle size of approximately 200 micron to approximately 1,000 microns, preferably approximately 400 micron to approximately 800 microns. The second thermoplastic polymer particles can be ground from polymer pellets to the desired particle sizes using methods known in the art including, but not limited to, a pulverizer or a hammer mill.

The colloidal polymer particles; i.e., either thermosetting or thermoplastic, comprise about 5% to about 95% by weight and the larger second thermoplastic polymer particles comprise about 5% to about 95% by weight based on the total weight of dry polymer; i.e., the combined weight of dry colloidal polymer particles and dry second thermoplastic polymer particles. Preferably, the colloidal polymer particles comprise about 50% to about 95% by weight based on the total weight of dry polymer, more preferably about 50% to about 60% by weight based on the total weight of dry polymer. Preferably, the second thermoplastic polymer particles comprise about 5% to about 50% by weight based on the total weight of dry polymer, more preferably about 40% to about 50% by weight based on the total weight of dry polymer. The percentages listed above include all of the intermediate percentage values.

The aqueous polymer dispersion comprises water and both colloidal polymer particles and larger second thermoplastic particles (as discussed above) dispersed therein. The aqueous polymer dispersion contains approximately 5% to approximately 90% by weight polymer solids, preferably approximately 30% to approximately 70% by weight polymer solids, more preferably approximately 50% by weight polymer solids.

In order to assist in the suspension and dispersion of both the colloidal polymer particles and the larger second thermoplastic polymer particles, approximately 3% to approximately 5% by weight of a dispersion agent can be included. If a commercially available aqueous polymer dispersion is used, for example a polymer latex, it will already include a dispersion agent and usually no additional dispersion agent is necessary for the second thermoplastic polymer particles. Suitable dispersion agents are those typically used to make aqueous polymer dispersions from solid, non-soluble polymer particles of the sizes set forth above and include, but are not limited to, guar gum, agar gum, xanthan gum, and sodium polyacrylate.

If the aqueous polymer dispersion is to be made into a foam, the aqueous polymer dispersion composition can additionally include a foaming agent, preferably approximately 0.5% to approximately 5% by weight foaming agent, more preferably approximately 1% to approximately 2% by weight foaming agent, most preferably approximately 1% by weight foaming agent. Suitable foaming agents are those typically used in the carpet industry and include, but are not limited to, sodium lauryl sulfate and sodium lauryl ether sulfate.

The aqueous polymer dispersion can optionally include one or more of the following additional ingredients: a plasticizer, a thickener, a lubricant, a wetting agent, a blowing agent, a colorant, a fire retardant and an inert filler. These additives generally are preferably added to the aqueous polymer dispersion at the rates shown in Table 1 below.

TABLE 1

| Ingredient | % by Weight |
| --- | --- |
| Plasticizers | 3% to 5% |
| Foaming agent | 0.1% to 2% |
| Thickeners | 0.1% to 2% |
| Blowing agent | 0.1% to 2% |
| Lubricants | 0.1% to 2% |
| Wetting agents | 0.1% to 2% |
| Colorants | 0.05% to 0.1% |
| Fire retardants | 0.05% to 0.1% |
| Fillers | 10% to 50% |

The colloidal thermosetting polymer particles can be made from any thermosetting polymer that can be used in carpet or synthetic turf applications as a precoat. Preferred the colloidal thermosetting polymer particles are styrene butadiene (SBR), carboxylated styrene butadiene or vinyl acetate ethylene (VAE).

The second thermoplastic polymer particles can be made from any thermoplastic polymer that can be used in carpet or synthetic turf. Preferably the second thermoplastic polymer particles include, but are not limited to, nylons, polyethylene, polypropylene, polystyrene, poly(methyl methacrylate), poly(vinyl chloride), poly(vinyl acetate), polycarbonate, polycaprolactone, poly(ethylene oxide), poly(vinyl alcohol), poly(ethylene terephthalate), poly(ether sulphone), poly(butyl terephthalate), poly(ethyl methacrylate), ultrahigh molecular weight polyethylene. Particularly preferred second thermoplastic polymers include nylon, including polyadipamide, polycaprolactam, copolymers, and blends thereof; polyolefins, including polyethylene, polypropylene, copolymers and blends thereof; thermoplastic polyester, including polytrimethyleneterephthlate and polyethyleneterephthalate, and blends thereof; acrylics, including polyacrylonitrile; co-polymers and blends thereof. Especially preferred second thermoplastic polymers particles are high density polyethylene (HDPE), low density polyethylene (LDPE), linear low density polyethylene (LLDPE), polypropylene (PP), poly-vinyl chloride (PVC), ethylene-vinyl acetate (EVA), styrene ethylene butylene styrene (SEBS), poly(styrene-block-butadiene-block-styrene) (SBS), polyamide, acrylonitrile butadiene styrene (ABS), thermoplastic polyurethane (TPU), polylactic acid (PLA), ethyl methacrylate (EMA) or polyester. The second thermoplastic polymer particles can be amorphous, semi-crystalline or crystalline before they are heated. The process is applicable to single polymers and to mixtures of polymers. For example, the mixture may be of polymers of the same composition but of different molecular weight, or chemically different polymers.

The colloidal thermoplastic polymer particles can be made from the same polymers as the second thermoplastic polymer particles as long as they can be ground to the necessary particle size. For example, low density polyethylene (LDPE) is not desirable for the colloidal thermoplastic polymer particles because it is too soft to grind to the colloidal particle size in a cost effective manner. However, high density polyethylene (HDPE) is useful for the colloidal thermoplastic polymer particles. Other preferred colloidal thermoplastic polymers include, but are not limited to, ethylene acrylic acid, polypropylene, polyethylene and copolymers thereof.

The tufted primary backing material 42 bearing the layer 56 of aqueous polymer dispersion foam on the belt 12 moves from the polymer deposition station 48 to a heated air oven 58. While the aqueous polymer dispersion is applied to the primary backing material 42 as a foam, it is preferred that the foam collapse relatively quickly after it is formed into a layer on the primary backing material. Preferably, the foam of the layer 56 will collapse somewhere between the doctor bar 54 and exiting the oven 58.

The heated air oven 58 is operated at a temperature sufficient to evaporate water from the aqueous polymer dispersion. Preferably, the heated air oven 58 is operated at a temperature sufficient to evaporate water from the aqueous polymer dispersion and soften or melt the thermoplastic polymer particles. More preferably, the heated air oven 58 is operated at a temperature of approximately 212° F. to approximately 300° F., especially, approximately 250° F. to approximately 275° F.

The speed of the belt 12, the length of the oven 58 and the temperature of the oven are all designed so that the layer 56 of aqueous polymer dispersion on the primary backing material 42 has a residence time in the oven such that the layer 56 is substantially dry when it leaves the oven. When the water is substantially removed from the aqueous polymer dispersion, the result is the colloidal thermosetting polymer particles or colloidal thermoplastic polymer particles have been absorbed into the interstices of the primary backing material 42 and the loop backs 46 and are thermally fused in place and a layer 60 of substantially dry softened or molten second thermoplastic polymer particles is formed on the upper surface (i.e., the surface opposite the face pile 44) of the primary backing material.

The tufted primary backing material 42 bearing the layer 60 of softened or molten second thermoplastic polymer particles moves with the belt 12 from the heated oven 58 to an optional thermoplastic polymer particle melting station 62. If the second thermoplastic polymer particles were not heated sufficiently within the heated oven 58, they can receive additional heat at the thermoplastic polymer particle melting station 62. The thermoplastic polymer particle melting station 62 comprises a plurality of infrared heaters 64, 66, 68, 70 disposed above the tufted primary backing material 42 bearing the layer 60 of second thermoplastic polymer particles on the primary backing material. The infrared heaters 64-70 are of a strength and are positioned a distance from the primary backing material 42 so that the layer of second thermoplastic polymer particles on the primary backing material, and if present the colloidal thermoplastic polymer particles absorbed into the primary backing material and loop backs 46, are heated to a temperature sufficient to soften or melt the second thermoplastic polymer particles and colloidal thermoplastic polymer particles. The infrared heaters 64-70 are positioned a distance above the belt 12, the belt is at a speed and the infrared heaters are of a size such that the residence time of the tufted primary backing material 42 bearing the layer 60 of second thermoplastic polymer particles, and if present the colloidal thermoplastic polymer particles, under the infrared heats is such that the second thermoplastic polymer particles and colloidal thermoplastic polymer particles are heated to a temperature equal to or higher than the melting point of the thermoplastic polymer particles. Preferably, the layer 60 of second thermoplastic polymer particles on the tufted primary backing material 42, and if present the colloidal thermoplastic polymer particles, are heated by the infrared heaters 64-68 to a temperature of approximately 212° F. to approximately 350° F., more preferably, approximately 212° F. to approximately 275° F. The objective of using the infrared heaters 64-70 is to convert the second thermoplastic polymer particles that make up the layer 60, and if present the colloidal thermoplastic polymer particles, to at least a mesophase between a solid and a liquid, and preferably, to a flowable material or a liquid.

Disposed above the belt 12 is a supply roll 72 of a secondary backing material 74. The secondary backing material 74 feeds from the supply roll 72 under a chilled press roller 76. The chilled press roller 76 is a hollow roller into which cold water is circulated. As the tufted primary backing material 42 bearing the melted second thermoplastic polymer particles, and if present the colloidal thermoplastic polymer particles, moves from the thermoplastic polymer particle melting station 62 and passes under the chilled press roller 76, the secondary backing material 74 is pressed into intimate contact with the melted second thermoplastic polymer particles on the tufted primary backing material 42. The pressure of the chilled press roller 76 on the primary backing material 42 and the secondary backing material 74 causes the melted second thermoplastic polymer particles to flow into both the primary backing material and the secondary backing material. Then, the chilled press roller 76 cools the secondary backing material 74, which in turn removes heat from the melted second thermoplastic polymer particles, and if present the colloidal thermoplastic polymer particles, and causes them to solidify thereby securely attaching the secondary backing material to the primary backing material 42 and also further securely anchoring the loop backs 46 in the primary backing material, which forms a laminated carpet structure 78.

The secondary backing material 74 can be woven or nonwoven. The secondary backing material 74 can be made from natural or synthetic materials. Furthermore, the primary backing material 42 and the secondary backing material 74 can be made from the same material or different materials. However, it is particularly preferred that the face pile 44, the primary backing material 42 and the secondary backing material 74 all be made from thermoplastic polymer materials. Suitable thermoplastic polymer materials for the secondary backing material 74 include, but are not limited to, nylon, including polyadipamide, polycaprolactam, copolymers, and blends thereof; polyolefin, including polyethylene, polypropylene, copolymers and blends thereof; thermoplastic polyester, including polytrimethyleneterephthlate and polyethyleneterephthalate, and blends thereof; acrylics, including polyacrylonitrile; co-polymers and blends thereof.

The laminated carpet structure 78 moves with the belt 12 from the chilled press roller 76 to a stripping roller 80 where the laminated carpet structure is removed from the belt and collected in a take up roll 82.

While the foregoing embodiment of the present invention has been disclosed as being useful for the manufacture of a carpet, it is specifically contemplated that the present invention can be used for the manufacture of synthetic turf. For example, a synthetic turf can be made using the present invention wherein the synthetic turf comprises thermoplastic face yarns, fibers or filaments, such as polyethylene, polypropylene, nylon or combinations thereof and a thermoplastic primary backing. Typically, synthetic turf does not include a secondary backing. However, if it is desired a thermoplastic secondary backing can be attached to the thermoplastic primary backing of a synthetic turf using the present invention. The primary backing can be attached to the secondary backing with the aqueous polymer dispersion in accordance with the present invention. This provides a synthetic turf product that is completely recyclable which has been long sought by the industry, if the colloidal thermoplastic particles are used with the aqueous polymer dispersion.

Most synthetic turf is made from polyethylene face fiber, which is relatively heat sensitive. When processing synthetic turf that is sensitive to prolonged temperatures above 212° F. (100° C.), the thermoplastic for the polymer particles should be selected so that it melts at a temperature near 212° F. (100° C.), such as at approximately 225° F. This prevents the synthetic turf fibers from being adversely affected while the thermoplastic polymer particles are being melted and mechanically driven into the primary backing material by the chilled press roller. Additionally, the heated air oven 58 can be partitioned so that the lower portion of the oven, in which the face fiber of the synthetic turf is disposed, can be at a lower temperature than the upper portion of the oven, in which the primary backing material 42 bearing the layer 56 of foam of the aqueous polymer dispersion is disposed.

On the other hand, carpets are primarily made from nylon or polyester face fiber, which are not as heat sensitive as synthetic turf. Therefore, for carpet the polymer chosen for the thermoplastic polymer particles can have a relatively higher melting point, if needed or desired for specific properties. The higher melting point polymers for the thermoplastic polymer particles provide greater flexibility of increased oven processing temperatures, if desired, which can reduce overall processing time.

As used herein the term "substantially dry" means containing less than 5% by weight moisture.

A particular advantage of the present invention is that the polymers used for the thermoplastic polymer particles in the aqueous polymer dispersion can be regrind polymers, off-specification polymers or recycled polymers. Regarding the use of recycled polymers, it is specifically contemplated that the thermoplastic polymer particles in the aqueous dispersion can be obtained from recycled synthetic turf. In that regard, it is contemplated that the process disclosed in U.S. Pat. No. 8,809,405 (the disclosure of which is incorporated herein by reference in its entirety) can be used to provide thermoplastic polymer pellets for use in the present invention. In addition, a carpet or synthetic turf made in accordance with the present invention employing a thermoplastic face pile, primary backing and secondary backing will be completely recyclable and can be used as feedstock for the process disclosed in U.S. Pat. No. 8,809,405.

Another advantage of the present invention is that the use of a foam of the aqueous polymer dispersion provides a convenient way to uniformly and repeatable deposit relatively small amounts of both thermosetting and thermoplastic polymer particles on a primary backing of a carpet or synthetic turf. These relatively small amounts of adhesive provide cost saving in manufacturing costs while not significantly adversely affecting physical properties, especially tuft lock and bond strength between the primary backing and secondary backing.

Figure 3:
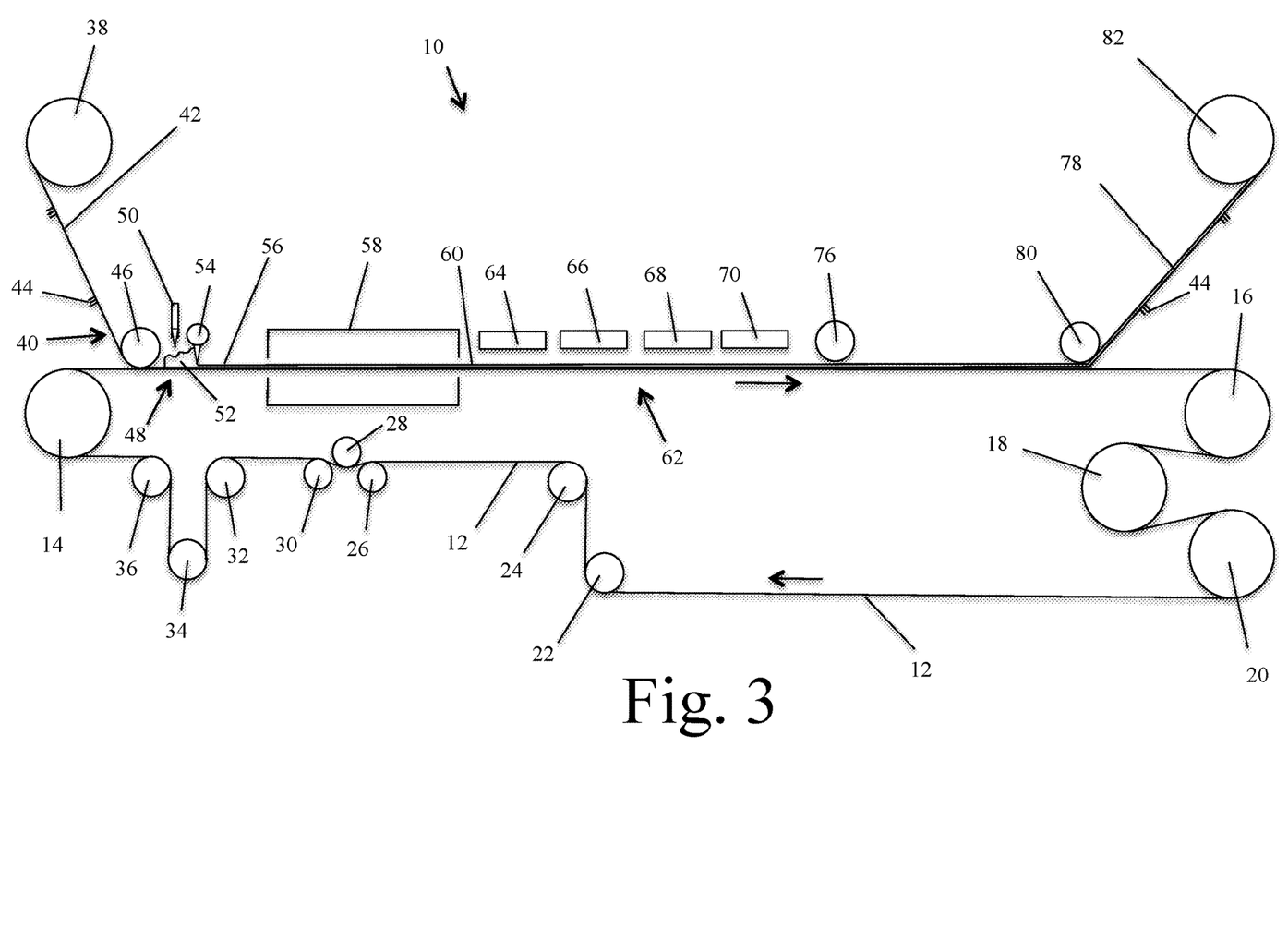
FIG. 3 is a schematic view of another disclosed embodiment of an apparatus for preparing carpet or synthetic turf using the adhesive system of the present invention.

FIG. 3 shows an alternate disclosed embodiment of the present invention. The apparatus shown in FIG. 3 is identical to the apparatus shown in FIG. 1, except there is no secondary back involved. The processing of the carpet in FIG. 3 is also identical to that shown in FIG. 1 up to the point where the coated primary backing 42 emerges from the heated oven 58 and optionally from the infrared heaters 64-70. At that point, the layer 60 of softened or molten second thermoplastic polymer particles formed on the upper surface of the primary backing 42, and if present the colloidal thermoplastic polymer particles absorbed into the primary backing and loop backs 44, passes under the chilled press roller 76. Since the chilled press roller 76 is in direct contact with the layer 60 of softened or molten second thermoplastic polymer particles, the chilled press roller flattens the layer of softened or molten second thermoplastic polymer particles into a continuous polymer film on the primary backing 42. The polymer film-coated primary backing 42 then moves from the chilled press roller 76 to a stripping roller 80 where the carpet structure is removed from the belt 12 and collected in the take up roll 82. This embodiment provides a system for both providing tuft lock or tuft bind and forming an integral polymer film on the primary backing in a single continuous process using a single coating material.

The following examples are illustrative of selected embodiments of the present invention and are not intended to limit the scope of the invention.

EXAMPLE 1

A tufted carpet product is prepared in accordance with the present invention. The carpet comprises a 0.5 inch pile height polyester face fiber tufted into a woven polypropylene primary backing. An aqueous polymer dispersion composition is prepared having the following formulation as shown in Table 2:

TABLE 2

| Ingredient | Percent by Weight | Description |
| --- | --- | --- |
| X-7358 | 75 | VAE Latex |
| Ace 2000P | 25 | 200 MI LDPE 0-840 micron |

The particles size for the Ace 2000P low density polyethylene thermoplastic particles is shown in Table 3 below:

| Ace 2000P Particle Size Distribution | |
| --- | --- |
| 500-841 micron | 44.30% |
| 212-500 micron | 51.17% |
| 90-212 micron | 4.43% |
| 0-90 micron | <0.1% |
| Approximate Average: | 589.45 microns |

Table 3 shows that the Ace 2000P thermoplastic particles have a calculated approximate average particle size of 589 microns with less than 5% of the particles falling below 200 microns.

The carpet is processed in accordance with the present invention as described above. The aqueous polymer dispersion of Table 2 is converted to a foam in a frothing machine. The foamed aqueous polymer dispersion is applied to the carpet primary backing and formed into a uniform layer at the rate of 6 ounces per square yard and the resulting layer is approximately 0.025 inches thick. The aqueous polymer dispersion foam coated polypropylene primary backing is heated in a heated oven at a temperature of 275° F. for a period of 8 minutes until the aqueous polymer dispersion is substantially dry. In the heated oven, the aqueous polymer dispersion foam quickly collapses and the substantially dry coating has no remaining foam structure. The colloidal thermosetting (SBR) particles of the aqueous polymer dispersion permeate into the interstices of the primary backing and the loop backs of the tufts and are fused in place. The second thermoplastic polymer (LDPE) particle coated carpet primary backing is then heated to a temperature of 250° F. under the infrared heaters for a period of 30 seconds until the second thermoplastic polymer particles melt. A woven secondary backing made from polypropylene is then applied to the melted second thermoplastic polymer particles. The carpet primary backing and secondary backing pass under a chilled press roller so that the primary backing and secondary backing are pressed into intimate contact and the melted second thermoplastic polymer particles flow both between the fibers of the woven primary and secondary backings. The chilled press roller removes heat from the molten thermoplastic polymer particles and causes them to solidify. The result is that the secondary backing is securely attached to the primary backing.

EXAMPLE 2

A tufted carpet product is prepared in the same manner as Example 1 above, except that an aqueous polymer dispersion composition is prepared having the following formulation as shown in Table 4:

TABLE 4

| Ingredient | Percent by Weight | Description |
| --- | --- | --- |
| X-7358 | 75 | VAE Latex |
| Rowalit H200 | 25 | 200 MI LDPE 0-200 micron |

The particles size for the Rowalit H200 low density polyethylene thermoplastic particles is shown in Table 5 below:

TABLE 5

| H200 Particle Size Distribution | |
| --- | --- |
| 80-212 micron | 97.10% |
| 0-80 micron | 2.90% |
| Approximate Average: | 142.926 microns |

Table 6 shows that the H200 thermoplastic particles have a calculated approximate average particle size of 143 microns.

EXAMPLE 3

The tufted carpet products prepared in Examples 1 and 2 above were subjected to delamination testing. The carpet samples were tested in accordance with ASTM D3936-035. The results of the delamination testing are shown in Table 6 below.

TABLE 6

| Sample | Delamination (lb/in) | Weight (oz./yd$^2$) | Polymer | Particle Size Range (microns) |
| --- | --- | --- | --- | --- |
| 1A | 3.13 | 10.62 | 2000P | 0-840 |
| 1B | 1.67 | 9.9 | 2000P | 0-840 |
| 1C | 1.26 | 5.72 | 2000P | 0-840 |
| 1D | 0.91 | 5.22 | 2000P | 0-840 |
| 2A | 0.59 | 9.73 | H-200 | 0-200 |
| 2B | 2.01 | 11.77 | H-200 | 0-200 |

TABLE 6-continued

| Sample | Delamination (lb/in) | Weight (oz./yd$^2$) | Polymer | Particle Size Range (microns) |
| --- | --- | --- | --- | --- |
| 2C | 0.68 | 6.61 | H-200 | 0-200 |
| 2D | 0.71 | 6.61 | H-200 | 0-200 |

The results shown in Table 6 above show that using a 200 Melt Index LDPE polymer with a 143 micron average particle size will give a delamination strength that is 35% to 45% lower than the same polymer with a 589 micron average particle size.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method comprising:
applying a composition to a tufted primary backing material, wherein the primary backing material has a first primary surface and a second primary surface, wherein tufts extend outwardly from the first primary surface and loop backs are formed on the second primary surface, and wherein the composition is applied to the loop backs and second primary surface of the tufted primary backing material, the composition comprising:
an aqueous dispersion of colloidal thermosetting polymer particles; and
thermoplastic polymer particles dispersed in the aqueous dispersion, wherein the thermoplastic polymer particles have an average particle size of approximately 200 microns to approximately 1,000 microns; and
heating the tufted primary backing material and composition to remove water therefrom.

2. The method of claim 1, wherein the tufted primary backing material is heated sufficiently such that the thermoplastic polymer particles are melted, the method further comprising:
applying a secondary backing material to the second primary surface of the primary backing material; and
allowing the primary backing material to cool, whereby the secondary backing material is adhered to the second primary surface of the primary backing material and the loop backs are adhered to the primary backing material.

3. The method of claim 1, wherein the colloidal thermosetting polymer particles are styrene butadiene (SBR), carboxylated styrene butadiene or vinyl acetate ethylene (VAE).

4. The method of claim 1, wherein the thermoplastic polymer particles are high density polyethylene (HDPE), low density polyethylene (LDPE), linear low density polyethylene (LLDPE), polypropylene (PP), poly-vinyl chloride (PVC), ethylene-vinyl acetate (EVA), styrene ethylene butylene styrene (SEBS), poly(styrene-block-butadiene-block-styrene) (SBS), polyamide, acrylonitrile butadiene styrene (ABS), thermoplastic polyurethane (TPU), polylactic acid (PLA), ethyl methacrylate (EMA) or polyester.

5. The method of claim 1, wherein the colloidal thermosetting polymer particles comprise about 5% to about 95% by weight based on the total weight of dry polymer particles.

6. The method of claim 1, wherein the colloidal thermosetting polymer particles comprise about 50% to about 60% by weight based on the total weight of dry polymer particles.

7. The method of claim 1, wherein the thermoplastic polymer particles comprise about 5% to about 95% by weight based on the total weight of dry polymer particles.

8. The method of claim 1, wherein the thermoplastic polymer particles comprise about 40% to about 50% by weight based on the total weight of dry polymer particles.

9. The method of claim 1, wherein the thermoplastic polymer particles have an average particle size of approximately 400 microns to approximately 800 microns.

10. The method of claim 1, wherein the colloidal thermosetting polymer particles are styrene butadiene (SBR) or vinyl acetate ethylene (VAE), wherein the thermoplastic polymer particles are low density polyethylene (LDPE) or thermoplastic ethylene-vinyl acetate (EVA), wherein the colloidal thermosetting polymer particles comprise about 30% to about 70% by weight based on the total weight of dry polymer particles and wherein the thermoplastic polymer particles comprise about 30% to about 70% by weight based on the total weight of dry polymer particles.

11. A method comprising:
applying a composition to a tufted primary backing material, wherein the primary backing material has a first primary surface and a second primary surface, wherein tufts extend outwardly from the first primary surface and loop backs are formed on the second primary surface, and wherein the composition is applied to the loop backs and second primary surface of the tufted primary backing material, the composition comprising:
an aqueous dispersion of colloidal thermosetting polymer particles; and
thermoplastic polymer particles dispersed in the aqueous dispersion, wherein the thermoplastic polymer particles have an average particle size of approximately 200 microns to approximately 1,000 microns;
heating the tufted primary backing material and composition to remove water therefrom and to melt the thermoplastic particles;
applying pressure to the thermoplastic polymer particles on the second primary surface of the tufted primary backing material so that the thermoplastic polymer particles are formed into a film; and
allowing the primary backing material to cool.

12. The method of claim 11, wherein the colloidal thermosetting polymer particles are styrene butadiene (SBR) or vinyl acetate ethylene (VAE) and the thermoplastic polymer particles are low density polyethylene (LDPE) or ethylene-vinyl acetate (EVA).

13. The method of claim 11, wherein the colloidal thermosetting polymer particles are styrene butadiene (SBR) or vinyl acetate ethylene (VAE) and the thermoplastic polymer particles are low density polyethylene (LDPE) or ethylene-vinyl acetate (EVA) and wherein the colloidal thermosetting polymer particles comprise about 30% to about 70% by weight based on the total weight of dry polymer particles and wherein the thermoplastic polymer particles comprise about 30% to about 70% by weight based on the total weight of dry polymer particles.

* * * * *